United States Patent [19]

Aoki et al.

[11] Patent Number: 5,380,358
[45] Date of Patent: Jan. 10, 1995

[54] INK, INK JET RECORDING METHOD USING THE SAME, AND INK JET RECORDING APPARATUS USING THE SAME

[75] Inventors: Makoto Aoki; Shoji Koike, both of Yokohama, Japan

[73] Assignee: Canon Kabushiki Kaisha, Tokyo, Japan

[21] Appl. No.: 96,999

[22] Filed: Jul. 27, 1993

[30] Foreign Application Priority Data

Jul. 31, 1992 [JP] Japan .................................. 4-204920

[51] Int. Cl.$^6$ .............................................. C09D 11/02
[52] U.S. Cl. .................... 106/20 R; 106/20 D
[58] Field of Search ............... 106/20 R, 20 D, 22 R, 106/22 H; 346/1.1

[56] References Cited

U.S. PATENT DOCUMENTS

| | | | |
|---|---|---|---|
| 4,142,914 | 3/1979 | Bast et al. | 106/22 D |
| 4,150,997 | 4/1979 | Hayes | 106/15.05 |
| 4,285,727 | 8/1981 | Uehara et al. | 106/22 R |
| 4,361,842 | 11/1982 | Haruta et al. | 106/22 K |
| 4,383,859 | 5/1983 | Moore et al. | 106/22 B |
| 4,557,761 | 12/1985 | Kobayashi et al. | 106/22 |
| 4,632,703 | 12/1986 | Koike et al. | 106/22 |
| 4,661,158 | 4/1987 | Kobayashi et al. | 106/22 |
| 4,689,078 | 8/1987 | Koike et al. | 106/22 |
| 4,838,938 | 6/1989 | Tomida et al. | 106/22 |
| 4,853,036 | 8/1989 | Koike et al. | 106/20 |
| 4,923,515 | 5/1990 | Koike et al. | 106/22 |
| 4,957,553 | 9/1990 | Koike et al. | 106/20 |
| 4,965,612 | 10/1990 | Sakaki et al. | 346/1.1 |
| 4,981,516 | 1/1991 | Kluger et al. | 106/22 H |
| 5,017,227 | 5/1991 | Koike et al. | 106/22 |
| 5,017,644 | 5/1991 | Fuller et al. | 106/22 H |
| 5,053,078 | 10/1991 | Koike et al. | 106/22 |
| 5,062,893 | 11/1991 | Adamic et al. | 106/22 K |
| 5,067,980 | 11/1991 | Koike et al. | 106/22 |
| 5,075,699 | 12/1991 | Koike et al. | 346/1.1 |
| 5,078,790 | 1/1992 | Tochihara et al. | 106/20 |
| 5,080,716 | 1/1992 | Aoki et al. | 106/20 |
| 5,092,926 | 3/1992 | Owatari | 106/22 H |
| 5,099,255 | 3/1992 | Koike et al. | 346/1.1 |
| 5,101,217 | 3/1992 | Iwata et al. | 346/1.1 |
| 5,118,351 | 6/1992 | Shirota et al. | 106/22 |
| 5,124,718 | 6/1992 | Koike et al. | 346/1.1 |
| 5,131,949 | 7/1992 | Tochihara et al. | 106/20 |
| 5,132,700 | 7/1992 | Tochihara et al. | 346/1.1 |
| 5,141,558 | 8/1992 | Shirota et al. | 106/22 |
| 5,151,128 | 9/1992 | Fukushima et al. | 106/20 |
| 5,190,581 | 3/1993 | Fukushima et al. | 106/20 D |
| 5,220,347 | 6/1993 | Fukushima et al. | 346/1.1 |
| 5,221,333 | 6/1993 | Shirota et al. | 106/20 D |
| 5,250,121 | 10/1993 | Yamamoto et al. | 106/22 R |

FOREIGN PATENT DOCUMENTS

| | | |
|---|---|---|
| 0363139 | 4/1990 | European Pat. Off. . |
| 0472196 | 2/1992 | European Pat. Off. . |
| 51-85804 | 7/1976 | Japan . |
| 54-51837 | 4/1979 | Japan . |
| 56-42684 | 4/1981 | Japan . |
| 58-89667 | 5/1983 | Japan . |
| 61-113668 | 5/1986 | Japan . |
| 61-113669 | 5/1986 | Japan . |
| 61-113671 | 5/1986 | Japan . |
| 61-113673 | 5/1986 | Japan . |

OTHER PUBLICATIONS

Derwent Abstract (WPIL) No. 84–034324 with respect to Japanese Patent Document No. 58-225171 (Dec. 27, 1983).

*Primary Examiner*—Helene Klemanski
*Attorney, Agent, or Firm*—Fitzpatrick, Cella, Harper & Scinto

[57] ABSTRACT

Provided is an ink which contains a recording agent and a liquid medium for dissolving or dispersing said recording agent, said ink being characterized in that said ink contains 0.01 to 50 ppm of a chelating agent based on the total weight of said ink.

23 Claims, 4 Drawing Sheets

INK, INK JET RECORDING METHOD USING THE SAME, AND INK JET RECORDING APPARATUS USING THE SAME

BACKGROUND OF THE INVENTION

1. Field of the Invention

The present invention relates to an ink, an ink jet recording method using the ink, and an ink jet recording apparatus. More specifically, it relates to an ink for ink jet recording for use in the so-called thermal jet recording in which thermal energy is applied to the ink to form droplets of the ink, an ink jet recording method, an ink jet recording unit, an ink cartridge, and an ink jet recording apparatus.

2. Related Background

As ink jet recording techniques, various methods have been heretofore developed, and above all, the so-called thermal jet recording method described in, for example Japanese Patent Application Laid-open No. 54-51837 is useful, because this method uses a high-density multi-nozzle very simply constituted and has the feature that high-quality images can be obtained at a high speed and at very low costs and the other feature that the printing is possible on plain papers having no special coating films.

According to this thermal jet recording method, a liquid to which thermal energy has been applied gives rise to a state change owing to the abrupt increase of volume. By functional force based on this state change, droplets are ejected through an orifice at the tip of a recording head, and these droplets then fly and adhere to a recording material, whereby the recording is carried out.

The principle and the constitution of the thermal jet recording method are very simple, but in order to always reliably realize the characteristics of high image quality and the high-speed printing, many techniques regarding an ink and a head are necessary. In the ink jet recording of the thermal jet type, performances necessary for the ink which can be printed on plain papers are mainly classified into a printing performance, a reliability and an ejection performance.

Important points regarding the printing performance and the reliability are following five items:

(1) Fixing property: The fixing property can be evaluated as a time necessary to apparently dry an ink printed on a recording paper to such a degree that the paper is not soiled with the ink even when rubbing the ink on the paper with a finger. It is preferable that this time is short;

(2) OD: OD is an optical density of an image printed on the recording paper. In general, when a high ratio of a dye that does not penetrate into the paper and remains on the surface of the paper, OD becomes high, which is preferable;

(3) Printed letter quality: The nearer to a true circle a recorded dot is, the more excellent the printed letter quality is. When a conventional ink is printed on plain paper, the printed dot having a rough boundary is obtained owing to an influence of the fiber of the paper;

(4) Crusting property: The crusting property means a property by which the ink evaporates and crusts (brings about clogging) in the head for ink jet recording. The ink which scarcely crusts is preferable; and (5) Initial ejection property: The initial ejection property means an ejection property of the ink at a time when the ink is initially ejected several times, after the moisture of the ink is evaporated through a nozzle point during the rest of the printing to increase the viscosity of the ink. There may be some cases that an ejecting direction is slanted or the ink is not ejected.

These characteristics can be roughly classified into the printing performances of the above-mentioned paragraphs (1) to (3) and the reliability of the abovementioned paragraphs (4) and (5). Most of these characteristics are contrary to each other, and therefore it is difficult to prepare the ink which meets all of the requirements.

For example, the fixing property is contrary to the crusting property. If much attention is paid to the fixing property, the easily evapotable property of the ink is an excellent requirement of the ink, whereas if the crusting property is predominantly considered, the scarcely evapotable property of the ink is an excellent requirement of the ink, which is quite opposite to the former. This is largely inconsistent.

Also between the fixing property and OD, a similar inconsistency is present. In order to improve the fixing property, the penetration of the ink into the recording paper must be increased, but in such a case, the ink inconveniently sinks in a depth direction of the paper. When the ink penetrates into the paper, the fiber on the surface of the paper scatters light to deteriorate OD.

There is also inconsistency between the fixing property and the printed letter quality. That is, the increase of the penetration of the ink into the recording paper leads to the improvement of the fixing property. However, the structure of the paper is nonuniform (due to roughness and fiber), and therefore the degree of the penetration varies. When the highly penetrative ink is used, the degree of the penetration is further variant, so that each dot deviates from the true circle and has a rough and dim boundary.

On the other hand, in the ink jet recording of the thermal jet type, the following four points are required as the ejection performances:

(1) Ejection stability: It is preferred that the size, velocity and direction of ink droplets ejected through an orifice are always uniform without variation;

(2) Ejection velocity: This ejection velocity means a velocity of the ink droplets ejected through the orifice. In generait the ejection velocity is preferably high and usually in the range of about 3 to about 20 m/sec;

(3) Frequency response: After the ink droplets have been ejected, the shorter the time necessary to replenish the ink as much as the amount of the ejected ink is, the higher the frequency response is, which is preferable; and (4) Life of the head: When a large amount of the recording has been carried out, a heater of the recording head is broken so that an ejection may become impossible sometimes. Alternatively, a deposit (the so-called scorch) is accumulated on the surface of the heater, so that the thermal energy of the heater is not effectively transmitted to the ink inconveniently at times. As a result, ejection performances such as the ejection stability, the ejection velocity and the frequency response deteriorate, or the amount of the ejected ink droplets changes on occasion. The life of the head is represented by the number of ejection pulses during maintence of the initial ejection performance.

Particularly, in order to prolong the life of the head, the improvement of the ink has been heretofore carried out. For example, The life of the head can be improved by keeping the content of a hearty metal in the ink at a certain concentration or less, as apparently disclosed in Japanese Patent Application Laid-open Nos. 61-113668 (Fe$\leq$4 ppm), 61-113669 (Fe+Si$\leq$9 ppm), 61-113671 (a divalent metal$\leq$20 ppm) and 61-113673 (P$\leq$2 ppm).

On the other hand, for example, as disclosed in Japanese Patent Application Laid-open No. 56-42684, it has also been suggested to include a substance used as a film-forming means in the ink to form a film on the surface of the heater, whereby the shock at the times of generation and extinction of bubbles (cavitation) can be relieved. A substance used as the film-forming means in accordance with this suggestion, can include metal-containing compounds such as organic metal chelate compounds, metal salts of an organic acid, metallized dyes and the like.

These suggestions can improve the life of the head to some extent, but they are still poor. The further improvement of the life of the head is desired.

SUMMARY OF THE INVENTION

Thus, an object of the present invention is to provide an ink for ink jet recording which is excellent in all of printing performances (fixing property, OD and printed letter quality), reliability (crusting property and initial ejection property) and ejection performances (ejection stability, ejection velocity, frequency response and the life of a head) which are performances necessary ior a plain paper-applicable type thermal jet recording.

Another object of the present invention is to provide an ink jet recording method which permits high-speed recording.

Still another object of the present invention is to provide an ink jet recording apparatus.

The above-mentioned objects can be achieved by aspects of the following present invention.

That is, the first aspect of the present invention is directed to an ink containing a recording agent and a liquid medium for dissolving or dispersing the recording agent, said ink being characterized by containing 0.01 to 50 ppm of a chelating agent based on the total weight of the ink.

The second aspect of the present invention is directed to a method for ink jet recording in which the recording is carried out by ejecting an ink in the form of droplets, said method being characterized in that the ink contains a recording agent, a liquid medium for dissolving or dispersing the recording agent, and 0.01 to 50 ppm of a chelating agent based on the total weight of the ink.

The third aspect of the present invention is directed to an ink jet recording unit which comprises an ink containing portion for containing an ink and a head portion for ejecting the ink in the form of droplets, said unit being characterized in that the ink is an ink described in the first aspect of the present invention.

The fourth aspect of the present invention is directed to an ink cartridge equipped with an ink containing portion for containing an ink, said cartridge being characterized in that the ink is an ink described in the first aspect of the present invention.

The fifth aspect of the present invention is directed to an ink jet recording apparatus which comprises an ink containing portion for containing an ink and a head portion for ejecting the ink in the form of droplets, said apparatus being characterized in that the ink is an ink described in the first aspect of the present invention.

The sixth aspect of the present invention is directed to an ink jet recording apparatus which comprises an ink cartridge equipped with an ink containing portion for containing an ink and a head portion for ejecting the ink in the form of droplets, said apparatus being characterized in that the ink is an ink described in the first aspect of the present invention.

DESCRIPTION OF THE PREFERRED EMBODIMENTS

An ink of the present invention is characterized by containing 0.01 to 50 ppm of a chelating agent in the ink.

Heretofore, in order to prevent the clogging of a head due to metal ions in a dye, a chelating agent has been added to an ink for ink jet recording for the purpose of masking the metal ions (refer to Japanese Patent Application Laid-open Nos. 51-85804 and 58-89667).

However, when such an ink is used for thermal jet recording, the life of the head is inversely shortened. Thus, the present inventors have investigated a relation between the life of the head and the chelating agent contained in the ink, and as a result, they have found that when the amount of the chelating agent contained in the ink is in the range of 0.01 to 50 ppm, there can be achieved the recording which is excellent in all of the printing performances, reliability and ejection performances and excellent in ejection stability and which particularly permits prolonging the life of the head. In consequence, the present invention has now been completed.

A durability test of the head has been made by the present inventors, and in this test, ethylenediaminetetraacetic acid (EDTA), the chelating agent, has been added to an ink in several the concentrations and the number of pulses has been changed. Afterward, the surface of the heater has been observed by means of SEM. As a result, it has been found that when the concentration of EDTA is high (more than 100 ppm), a surface layer (16-a in FIG. 3) of the heater has been gradually eroded, so that the surface layer has become thin, and after a certain time, a lower layer (16-b in FIG. 3) has been completely exposed, and the heater has been finally disconnected.

In the case that EDTA is not contained at all, the surface layer of the heater does not become thin and the disconnection is not observed at all. In view of the fact, it seems that if the chelating agent is contained at more than a certain concentration in the ink, the chelating agent erodes the surface of the heater at the timers of generation and extinction of bubbles to disconnect the heater, thereby shortening the life of the head.

Figure 1:
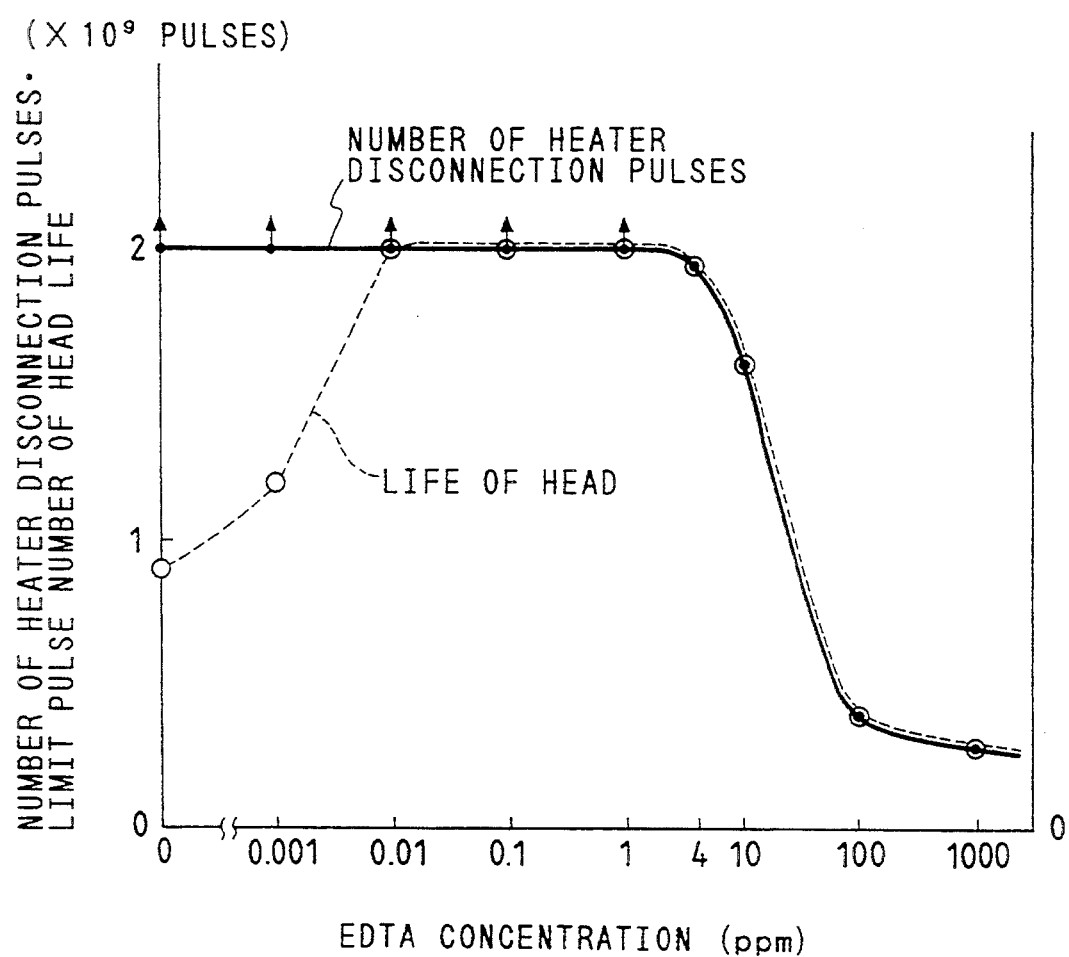
FIG. 1 shows a relation between the concentration of EDTA and a number of heater disconnection pulses and the life of a head.

FIG. 1 shows a relation between the concentration of EDTA contained in the ink and the number of heater disconnection pulses and the life of the head (the test ends with $2 \times 10^9$ pulses). It is apparent from the drawing that when the concentration of EDTA in the ink is in excess of 100 ppm, the disconnection of the heater occurs with $4 \times 10^8$ pulses or less to extremely shorten the life of the head.

In addition, the present inventors have found that when the EDTA concentration in the ink is too low (less than 0.001 ppm), the disconnection of the heater does not take place as described above, but the ejection performances of the head instead deteriorate in a long-term recording operation, so that the initial ejection performance cannot be maintained and the life of the head is shortened.

This cause is considered to be as follows: When generation and extinction of bubbles are repeated during a long period of time, a scorch is formed, depending upon the kind and the concentration of dye, even if the concentration of an impurity such as a heavy metal in the ink is below a certain level, in particular, if the preparation of the ink having a high OD is intended, the concentration of the dye becomes high, so that the scorch tends to be formed inconveniently.

If the scorch adheres to a heater surface, thermal energy of the heater is not effectively transmitted to the ink, and therefore ejection energy is lessened causing inconvenient results such as a less ejection concentration and a less ejection amount. For this reason, the life of the head is consumed prior to the disconnection of the heater.

On the contrary, in the case of the ink in which the concentration of EDTA is in the range of about 0.01 to about 50 ppm, the disconnection of the heater, and the deterioration in ejection performances of the head do not occur, so that the life of the head has been remarkably prolonged. The reason why the deterioration in ejection performances of the head performances do not occur in this concentration range is not definite, but it can be presumed that even if any scorch adheres to the heater surface owing to a large amount of the recording, the scorch is suitably eroded by the erosion function of slightly contained EDTA to prevent a large amount of the scorch from adhering to the heater surface and to always maintain the heater surface in a smooth state.

No particular restriction is put on the kind of chelating agent which can be contained in the ink of the present invention, so long as the effect of the present invention can be obtained. Nevertheless, preferable examples of The chelating agent include ethylenediaminetetraacetic acid (EDTA), trans-1,2-cyclohexanediaminetetraacetic acid, diethylenetriaminepentaacetic acid, ethylenediaminediacetic acid (EDDT), dioxaoctanediaminetetraacetic acid (GEDTA), N-(2-hydroxyethyl)ethylenediaminetriacetic acid (HEDTA), N-(2-hydroxyethyl)-iminodiacetic acid (HIDA), nitrilotriacetic acid (NTA), triethylenetetraminehexaacetic acid (TTHA), glycine, dihydroxyethyl glycine and salts thereof (e.g., EDTA.4Na).

The content of the chelating agent in the ink is in the range of from 0.01 to 50 ppm, preferably from 0.01 to 10 ppm, more preferably from 0.01 to 4 ppm, based on the total weight of the ink.

As a quantitative analyzing method of a trace amount of the chelating agent, the atomic absorption method [Kunkel, R., et al., Anal. Chem., Vol. 45, pp. 1465 (1973)] is preferably used in which a copper ion of Cu (II)-the chelating agent is quantitatively analyzed. Therefore, the concentration of the chelating agent in the present invention is based on values obtained by this analyzing method. If the concentration of the chelating agent is so low that the scatter of the analyzed values is influential, it is also possible to analyze it after the ink is concentrated.

The ink of the present invention contains at least a recording agent and a liquid medium for dissolving or dispersing the same in addition to the chelating agent.

As the recording agent, a dye or a pigment is selectively used in compliance with a requirement, but a preferable example of the recording medium in the present invention is a water-soluble dye.

Usable examples of the dyes include various water-soluble dyes such as direct dyes, acid dyes and basic dyes. The concentration of the dye is usually suitably selected from the range of from 0.1 to 10% by weight based on the total weight of the ink.

As the liquid medium which can be used in the ink of the present invention, it is preferable to use water and a water-soluble organic solvent together.

A useful example of the water-soluble organic solvent is a water-soluble organic solvent which is usually used in the ink for ink jet recording. That is, the water-soluble organic solvent preferably has low vapor pressure in itself, decreases the vaporization velocity of moisture in the ink, has properties for dissolving the dye and the like, and thus has an effect as a crusting property improver.

Examples of the preferably usable water-soluble organic solvents include amides such as dimethylformamide and dimethylacetamide; ketones and ketone alcohols such as acetone and diacetone alcohol; ethers such as tetrahydrofuran and dioxane; nitrogen-containing heterocyclic ketones such as N-methyl-2-pyrrolidone, 1,3-dimethyl-2-imidazolidinone and 2-pyrrolidone; polyalkylene glycols such as polyethylene glycol and polypropylene glycol; alkylene glycols containing an alkylene group of 2-6 carbon atoms such as ethylene glycol, propylene glycol, butylene glycol, triethylene glycol, thiodiglycol, hexylene glycol and diethylene glycol; glycerin; 1,2,3-hexanetriol; and lower alkyl ethers of polyvalent alcohols such as ethylene glycol methyl (or ethyl) ether, diethylene glycol methyl (or ethyl) ether and triethylene glycol monomethyl (or ethyl) ether.

Water is used in an amount of usually from 40 to 96% by weight, preferably from 60 to 95% by weight, more preferably from 73 to 94% by weight based on the total weight of the ink. If the amount of water is less than 40% by weight, there may be caused some problems such as viscosity increase, feathering and deterioration of the fixing property. If it is more than 96% by weight, a large amount of components are evaporated, and so the crusting property deteriorates. In order to improve the crusting property, there can be used a crust inhibitor which is different from conventionally used water-soluble organic solvents and which has an evaporation preventing effect, can improve the solubility of the dye and can inhibit the increase of the viscosity.

Examples of the crust inhibitors include urea, a salt of triethylamine such as triethylamine hydrochloride, a salt of triethanolamine such as triethanolamine hydrochloride, and derivatives of toluenesulfonamide. Preferably, the crust inhibitor is suitably selected from the above-mentioned examples and then used in an amount of from 0.1 to 30% by weight based on the total weight of the ink.

When such a crust inhibitor is used, any clogging of the head does not occur and high reliability can be kept up, even if constitutional components (the solvent and the like) other than water are used in an extremely small amounts. Furthermore, since the content of water in the ink is high, the ink on a print material is liable to evaporate, which is beneficial for recording performances on plain paper such as OD, fixing property and printed letter quality. In addition, urea has an effect for inhibiting a viscosity increase, and so it is effective for the improvement of the initial ejection property.

In addition to the above-mentioned solvents, another solvent for improving the fixing property may be used. The ink in which such a solvent is used is very excellent in drying characteristics, when printed on the recording paper. Preferable examples of the solvent which can expect such the effect include alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol and isobutyl alcohol; a cyclic alkyl alcohol such as cyclohexanol; amides such as dimethylformamide and dimethylacetamide; a ketone and a ketone alcohol such as acetone arid diacetone alcohol; ethers such as tetrahydrofuran and dioxane; nitrogen-containing heterocyclic ketones such as N-methyl-2-pyrrolidone and 1,3-dimethyl-2-imidazolidinone; glycerin; fatty acid alkylolamide, thiodiglycol and N-acyl-sarcosinate.

Of these compounds, most of alcohols such as ethyl alcohol have relatively low boiling points, and so each of these alcohols can function as an accelerator of bubbling which is an ejection energy source in the recording method in which the thermal energy is applied to the ink to eject ink droplets. Thus, such an alcohol also has the effect of increasing the ejection velocity.

In the ink of the present invention, a surface active agent can also be used. The surface active agent is used in an amount of usually from 0.01 to by weight, preferaDly from 0.01 to 0.2% by weight based on the total weight of the ink.

The viscosity of the ink which can be used in the present invention is in the range of from 0.7 to 12 cP, preferably from 1 to 5 cP at 25° C. The ink having a viscosity outside this range is slightly poor in an ejection stability in the ink jet recording. Particularly, in the case of the ink having a viscosity of more than 12 cP, its penetration into a recording material is slow owing to its viscosity resistance, which means that the fixing property is also poor.

The ink which can be used in the present invention preferably has a surface tension of from 26 to 60 dyne/cm at 25° C. If the surface tension of the ink is less than 26 dyne/cm, some disadvantageous phenomena such that bubbles may be engulfed, an orifice portion may be wetted and the like, due to a weak power for retracting a meniscus after droplets are ejected, or inversely, a weak power for retracting a meniscus when a meniscus is projected, will occur, which may sometimes cause slippage. If the surface tension of the ink is more than 60 dyne/cm, wettability is poor, so that a nozzle wall of the head is not wetted with the ink and this ink remains in the state of bubbles.

By investigating the constitution of such an ink as mentioned above, the ink for use in the plain paper-applicable type thermal jet recording can be provided which is excellent in head life, OD, fixing property, printed letter quality, crusting property, initial ejection property, ejection stability, ejection velocity and frequency response.

The ink of the present invention can be particularly suitably used in the ink jet recording method in which the droplets of the ink are ejected by the function of the thermal energy to achieve the printing, but needless to say, it can also be used as a usual writing implement.

As the suitable method and apparatus for carrying out the printing by the use of the ink of the present invention, there can be enumerated a method and an apparatus for applying thermal energy corresponding to a recording signal to the ink in a chamber of the recording head to generate droplets by thermal energy.

Figure 2:
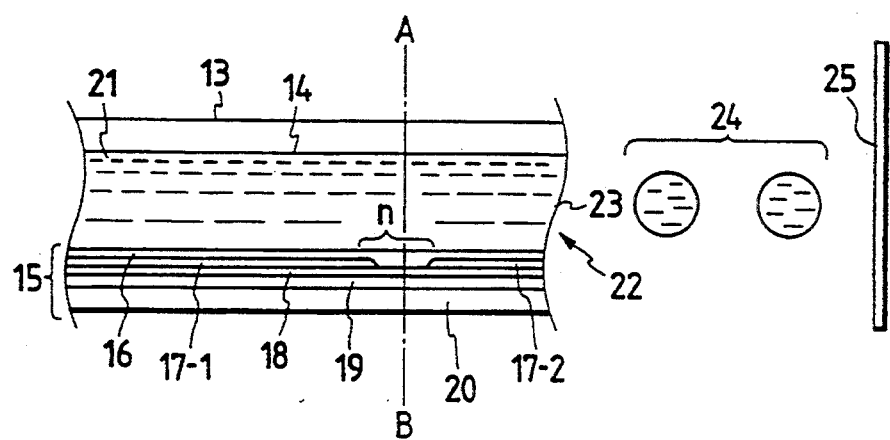
FIG. 2 is a cross section of a head portion of an ink jet recording apparatus.
Figure 3:
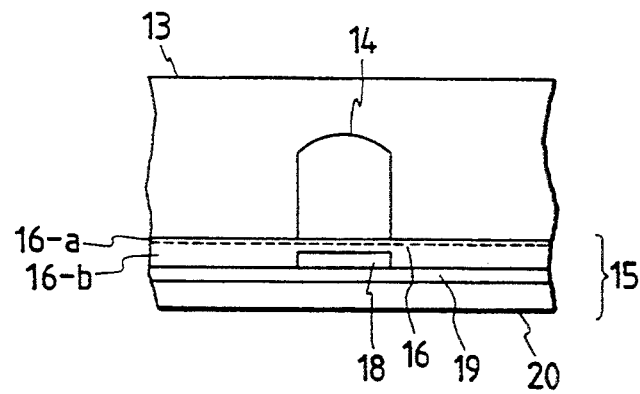
FIG. 3 is a longitudinal cross section of the head portion of the ink jet recording apparatus.
Figure 4:
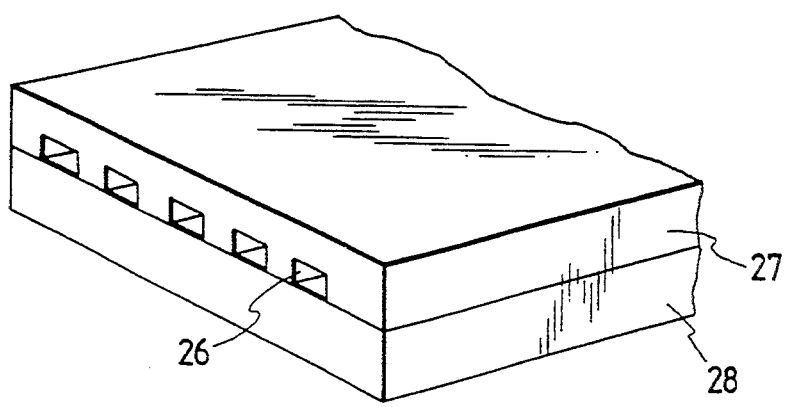
FIG. 4 is a perspective view of a head formed by multiplying the head shown in FIGS. 2 and 3.

A constitutional example of the head which is the main portion of the apparatus is shown in FIGS. 2, 3 and 4. A head 13 is obtained by combining a glass, ceramic or plastic plate having a groove 14 for allowing an ink to pass therethrough with a heating head 15 (the head is shown in the drawings, but the present invention is not limited thereto). The heating head 15 is constituted of a protective film 16 formed from silicon oxide, aluminum electrodes 17-1 and 17-2, a heating resistor layer 18 formed with Nichrome or the like, a heat accumulating layer 19 and a base plate 20 made of a material having a good heat releasing property such as alumina.

An ink 21 reaches an ejection orifice (fine pore) 22 and forms a meniscus 23 by pressure not shown in the figure. Now, when an electrical signal is applied to the electrodes 17-1 and 17-2, heat is abruptly generated from a region indicated by n of the heating head 15 to generate bubbles in the ink 21 which comes in contact with the heating head 15. Then, the meniscus 23 is projected by the resultant pressure to eject the ink 21, so that recording droplets 24 fly from the orifice 22 toward a recording material 25. FIG. 4 shows an appearance of a multi-head in which many heads, one of which is shown in FIG. 2, are arranged. The multi-head is formed by closely combining a glass plate 27 having a multi-groove 26 with the same heating head 28 as in FIG. 2.

Figure 5:
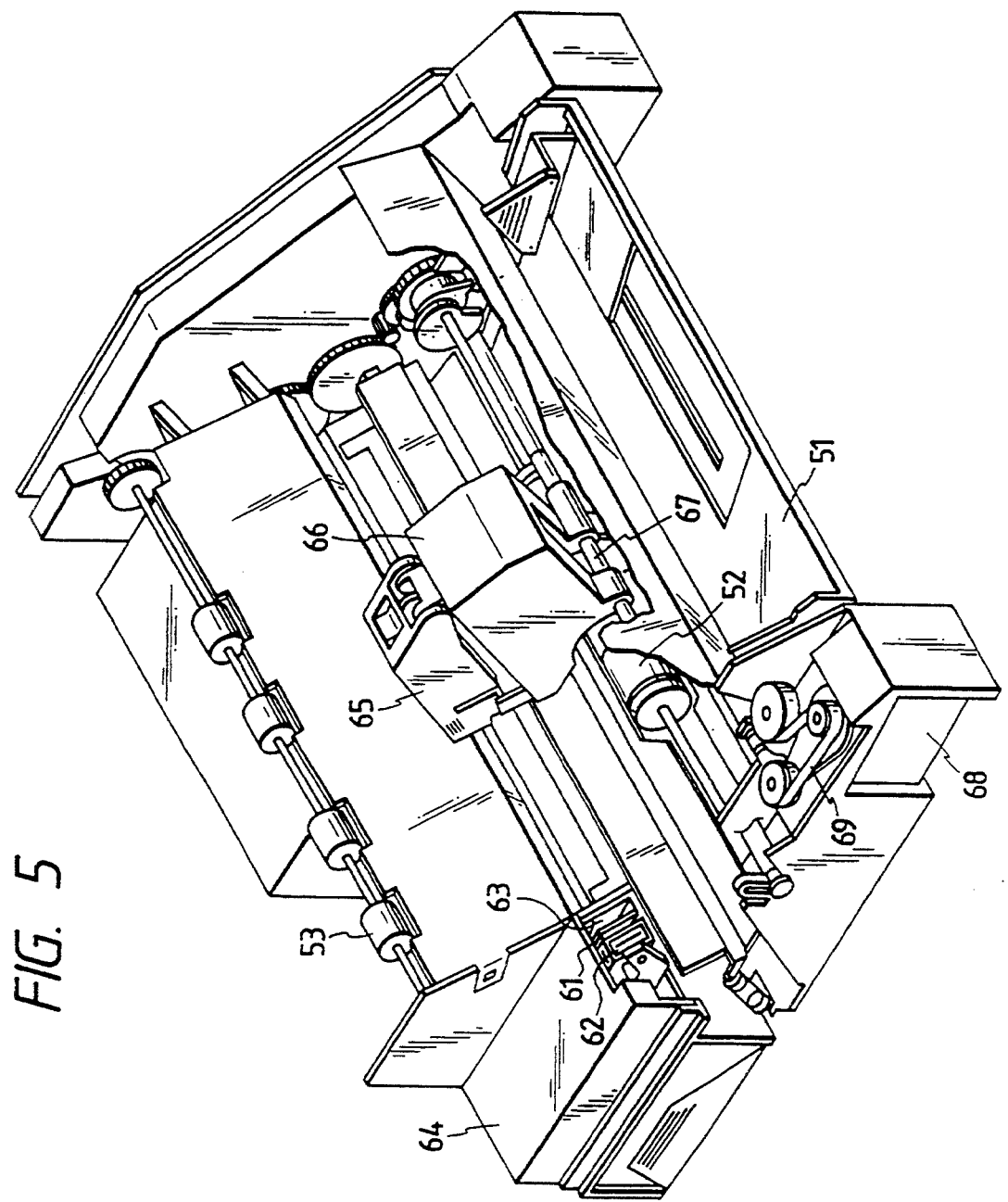
FIG. 5 is a perspective view showing one example of the ink jet recording apparatus.

FIG. 2 is a cross sectional view of the head 23 along an ink flow channel, and FIG. 3 is a cross sectional view cut along a line A-B. FIG. 5 shows one example of an ink jet recording apparatus incorporated with the head. In FIG. 5, reference numeral 61 is a blade as a wiping member, and its one end is a fixed end which is supported by a blade supporting member and which functions as a cantilever. The blade 61 is disposed adjacent to a recording region for the recording head.

In this embodiment, the blade 61 is held into such a form that it protrudes to a moving passage of the recording head. Reference numeral 62 is a cap which is disposed at a home position adjacent to the blade 61 and which can move in the moving direction of the recording head and a vertical direction in order to come in contact with and cap an ejection hole surface. Furthermore, reference numeral 63 is an ink absorber arranged adjacent to the blade 61 and held into such a form that it protrudes into the moving passage of the recording head. An ejection recovery portion 64 is constituted of the blade 61, the cap 62 and the absorber 63, and water and dust on the ink ejection hole surface are removed therefrom by the blade 61 and the absorber 63.

Reference numeral 65 is a recording head which has an ejection energy generating means and ejects the ink to the recording material which is disposed so as to confront the ejection hole surface, thereby carrying out the recording. Reference numeral 66 is a carriage on which the recording head 65 is mounted and which can move the recording head 65. The carriage 66 is slidably engaged with a guide axis 67, and a part of the carriage 66 is connected (not shown) with a belt 69 which can be driven by a motor 68, whereby the carriage 66 can be moved along the guide axis 67 to the recording region for the recording head 65 and a region adjacent thereto.

Reference numeral 51 is a paper feeder for feeding the recording material, and reference numeral 52 is a paper feed roller which can be driven by a motor not shown in the figure. According to this constitution, the recording material is fed to a position which confronts the ejection hole surface of the recording head, and as the recording proceeds, the material to be recorded is forwarded to a paper discharge section where paper discharge rollers 53 are arranged.

In the above-mentioned constitution, when the recording head 65 returns to the home position at the time of the end of the recording or the like, the cap 62 of the head recovery portion 64 retracts from the moving passage of the recording head 65, but the blade 61 protrudes into the moving passage. As a result, the ejection hole surface of the recording head 65 is wiped. In this connection, when the cap 62 comes in contact with the ejection hole surface of the recording head 65 to cap the ejection hole surface, the cap 62 moves so as to protrude into the moving passage of the recording head.

In the case that the recording head 65 moves from the home position to a recording start position, the cap 62 and the blade 61 are at the same position as in the above-mentioned wiping operation. As a result, even at the time of this movement of the recording head 65, the ejection hole surface of the recording head 65 can be wiped. The movement of the recording head to the home position adjacent to the recording region is carried out at a predetermined interval at the end of the recording, at the time of ejection recovery and during the movement of the recording head in the recording region, and the above-mentioned wiping operation is made during this movement.

Figure 6:
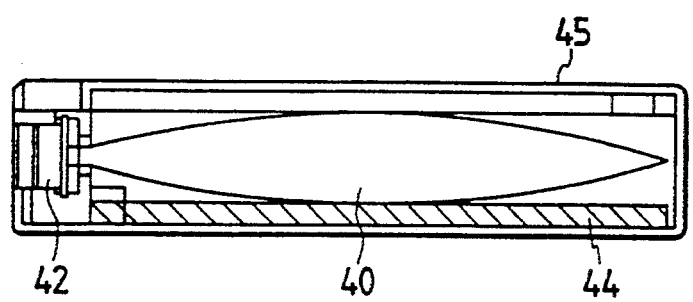
FIG. 6 is a longitudinal cross section of an ink cartridge.

FIG. 6 shows one example of an ink cartridge in which an ink fed to the head via an ink feed member, for example a tube, is contained. Here, reference numeral 40 is an ink containing section containing the ink to be fed, and for example it is an ink bag. At the tip of the ink bag 40, a plug 42 made of a rubber is mounted. The ink in the ink bag 40 can be fed to the head by inserting a needle (not shown) into this plug 42. Reference numeral 44 is an ink absorber for absorbing and receiving a waste ink. In the present invention, the surface of the ink absorber which comes in contact with the ink is preferably made of polyolefin, particularly polyethylene.

The ink jet recording apparatus used in the present invention may not be limited to the above-mentioned apparatus in which the head and the ink cartridge are separated. Therefore, an apparatus in which they are integrally associated as shown in FIG. 7 can be also used.

Figure 7:
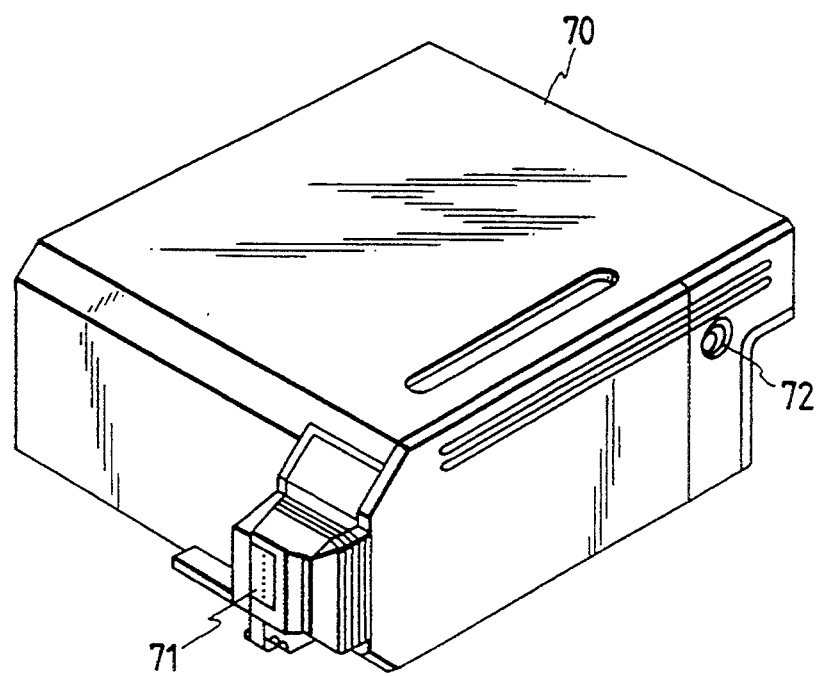
FIG. 7 is a perspective view of a recording unit.

In FIG. 7, reference numeral 70 is a recording unit, and in this recording unit, an ink containing, section for containing the ink, for example an ink absorber is placed. The ink absorber is constituted so that the ink in the ink absorber can be ejected in the form of ink droplets through the head portion 71 having a plurality of orifices. As the material of the ink absorber, it is preferable for the present invention to use polyurethane.

Reference numeral 72 is an air passage for communicating the interior of the recording unit 70 to the atmosphere. The recording unit 70 can also be used in place of the recording head shown in FIG. 5 and it is detachably attached to the carriage 66.

EXAMPLES

The present invention will be described more detail in reference to Examples and Comparative Examples, but the scope of the present invention should not be limited to these Examples. In this connection, it is to be noted that parts and percent are based on weight, unless otherwise specified.

Examples 1 to 6 And Comparative Examples 1 To 3

Components shown in Table 1 were mixed in a beaker and then stirred at 25° C. for 4 hours. The resultant mixture was filtered through a membrane filter having a pore size of 0.22 μm under pressure to obtain inks of the present invention.

By the use of these inks, printing was carried out on a plain paper (a PPC paper SK made by Canon Inc.) by a Canon thermal jet printer BJC-820J (resolution=360 DPI, and ink ejection amount=45 pl), respectively, and evaluations were then made with regard to fixing property, OD, printed letter quality, crusting property, ejection stability, ejection velocity, frequency response, initial ejection property and the life of the head, and also the viscosity and the surface tension of the ink were measured. These results are set forth in Table 1.
(Procedures of evaluation and evaluation standard)
(1) Evaluation of fixing property English characters and figures were printed on an SK paper by a printer and then rubbed with a filter paper (trade name No. 2, made by Toyo Roshi Co., Ltd.) after 10, 20, 30, 40, 50 and 60 seconds to measure a time at which the filter paper was not soiled any more (the measurement was made at 20°±5° C. and 50±10% RH). The fixing property was judged by the measured time. The evaluation was ranked as follows:
  o: 15 seconds or less
  Δ: 16–30 seconds
  x: 31 seconds or more
(2) Evaluation of OD Solid printing of each 4.5×9 mm was carried out on an SK paper, and the printed samples were then allowed to stand at ordinary temperature and ordinary humidity for 24 hours or more. Afterward, the printed portions were measured by a Macbeth densitometer (RD918) to judge OD by the measured OD value. The evaluation was ranked as follows:
  o: the OD value of 1.1 or more
  Δ: the OD value of 0.8–1.0
  x: the OD value of less than 0.8
(3) Evaluation of printed letter quality English characters and figures were printed in an SK paper and then allowed to stand for one hour or more, and featbering at a dot level and the sharpness of boundaries of the English characters and the figures were evaluated at 25° C. and 60% RH. The evaluation was ranked as follows:
  o: No feathering is noted, and the boundaries are sharp.
  Δ: Slightly feathering is noted, and the boundaries are also slightly unsharped.

x: Feathering is noticeably noted, and the boundaries and dots are also slightly unsharped.

(4) Evaluation of crusting property

A printer was filled with a predetermined amount of an ink, and English characters and figures were continuously printed for 10 minuts. Afterward, the printing was stopped and a cap was attached, and the printer was allowed to stand for 30 days (standing conditions=60° C. and 10±5% RH). Then, the English characters and the figures were printed again, and the crusting property was judged by the number of recovery operations until the initial printing state could be reproduced again, The evaluation was ranked as follows:

⊚: The initial printing state can be obtained without the recovery operation, o: The initial printing state can be obtained by carrying out the recovery operations 1-5 times.

Δ: The initial printing state can be obtained by carrying out the recovery operations 6-10 times.

x: The initial printing state can be obtained by carrying out the recovery operations 11 times or more.

(5) Ejecting stability, ejecting velocity and frequency response

By the use of a head evaluating device for ink jet recording made by Canon Inc, (a device in which the ejection state of a droplet is observed by a microscopical television camera under a synchronous stroboscopic light), the scatter of the ejection velocity, the ejection velocity and the frequency response of various kinds of inks were measured under the same head driving conditions as in the printing by a printer.

(a) Evaluation of ejection stability

The ejection velocity was measured 30 times at 4 kHz by means of the above-mentioned head evaluating device, and its standard deviation was judged. The evaluation was ranked as follows:

o: Standard deviation=0 to 0.49 m/sec

Δ: Standard deviation=0.5 to 1.0 m/sec x: Standard deviation=1.1 m/sec or more (b) Evaluation cf ejection velocity The ejection velocity was measured 30 times at 4 kHz by means of the above-mentioned head evaluating device, and its average value was calculated to judge the ejection velocity. The evaluation was ranked as follows:

o: Ejection velocity=7.1 to 15 m/sec

Δ Ejection velocity=5 to 7 m/sec x: Ejection velocity=less than 5 m/sec (c) Evaluation of frequency response Ejection was carried out at a driving frequency of 0.1 kHz by means of the above-mentioned head evaluating device, and the driving frequency was gradually increased. The frequency response was judged by measuring the frequency at which an ejection became in an unstable sword shape having no main droplet. The evaluation was ranked as follows:

o: Frequency response=more than 4 kHz

Δ: Frequency response=2 to 4 kHz x: Frequency response=less than 2 kHz (6) Evaluation of initial ejection property After the ink was ejected under circumstances of 15° C. and 10% RH, an uncapped state was maintained for a predetermined time, and afterward, the ink was ejected again. At this time, the ejection state of the first several droplets was observed, and the initial ejection property was judged from a time for which the ejection state was kept good. The evaluation was ranked as follows:

o: More than 20 seconds

Δ: 5 to 20 seconds x: Less than 5 seconds (7) Life of the head

The ink was continuously ejected at 4 kHz by means of the device used in the preceding paragraph (5), and the ejection stability, the ejection velocity and the frequency response were evaluated at each interval of $10^7$ pulses. The life of the head was judged from the number of the pulses at which these performances changed from their evaluation results before the continuous ejection. The evaluation was ranked as follows:

⊚: The life of the head=more than $1.8 \times 10^9$ o: The life of the head=1.5 to $1.8 \times 10^9$ Δ: The life of the head=0.8 to $1.49 \times 10^9$ x: The life of the head=less than $0.8 \times 10^9$ (8) Viscosity By the use of an E type viscometer VISCONIC ELD (Tokyo Keiki Co., Ltd.), the viscosity was measured at 25° C.

(9) Surface tension

By the use of a Kyowa CBVP type surface tension meter (Kyowa Science Co., Ltd.), the surface tension was measured at 25° C.

TABLE 1

| | Example 1 | Example 2 | Example 3 | Example 4 | Example 5 | Example 6 | Comp. Ex. 1 | Comp. Ex 2 | Comp. Ex. 3 |
|---|---|---|---|---|---|---|---|---|---|
| Dye | | | | | | | | | |
| C.I. Food Black 2 | 3 | 3 | 3 | — | — | — | 3 | 3 | — |
| C.I. Direct Yellow 86* | — | — | — | 2 | 2 | 2 | — | — | 2 |
| Solvent | | | | | | | | | |
| Glycerin | 6 | 5 | 6 | 6 | — | — | 5 | 6 | 6 |
| Diethylene glycol | 10 | — | 10 | 10 | 15 | — | — | 10 | 10 |
| Thiodiglycol | — | 5 | — | — | — | 25 | 5 | — | — |
| Water | 78.9 | 77.9 | 78.9 | 79.9 | 80.9 | 73.0 | 77.9 | 80.9 | 74.8 |
| Others | | | | | | | | | |
| Urea | — | 5 | — | — | — | — | 5 | — | — |
| Isopropyl alcohol | 2 | 4 | 2 | 2 | 2 | — | 4 | — | 6 |
| Acetylenol EH (Kawaken Fine Chemicals Co., Ltd.) | 0.1 | 0.1 | 0.1 | 0.1 | 0.1 | — | 0.1 | — | 1 |
| EDTA.4Na | $1.4 \times 10^{-6}$ | $1.4 \times 10^{-5}$ | $1.4 \times 10^{-4}$ | 0 | 0.0004 | 0.0013 | 0 | 0.14 | 0.23 |
| EDTA Conc (ppm)** | 0.01 | 0.1 | 1 | 1 | 4 | 10 | 0 | 1000 | 2000 |
| Physical Properties | | | | | | | | | |
| Viscosity | 2.0 | 1.9 | 2.0 | 2.0 | 1.9 | 3.0 | 1.9 | 2.0 | 2.1 |
| Surface tension | 38 | 38 | 38 | 38 | 37 | 58 | 38 | 60 | 30 |
| Evaluation | | | | | | | | | |
| Fixing property | o | o | o | o | o | o | o | x | o |
| OD | o | o | o | o | o | o | o | o | x |

TABLE 1-continued

|  | Example 1 | Example 2 | Example 3 | Example 4 | Example 5 | Example 6 | Comp. Ex. 1 | Comp. Ex 2 | Comp. Ex. 3 |
|---|---|---|---|---|---|---|---|---|---|
| Printed letter quality | o | o | o | o | o | o | o | o | x |
| Crusting property | ⊙ | ⊙ | ⊙ | ⊙ | ⊙ | ⊙ | ⊙ | ⊙ | ⊙ |
| Ejection property | o | o | o | o | o | o | o | x | o |
| Ejection velocity | o | o | o | o | o | o | o | Δ | o |
| Frequency response | o | o | o | o | o | o | o | o | o |
| Initial ejection property | o | o | o | o | o | o | o | x | x |
| Life of head | ⊙ | ⊙ | ⊙ | ⊙ | ⊙ | o | x | x | x |

*In the DY 86 used in the examples, 50 ppm of EDTA added at the purification of the dye remained.
**Each EDTA concentration was a value measured by an atomic absorption method.

According to the present invention described above, the reliability of a recording head can be improved, and high-speed drying characteristics, high recording concentration and high printed letter quality can be maintained for a long period of time. The present invention can provide an ink, an ink jet recording method using the ink, and an ink jet recording apparatus using the ink.

What is claimed is:

1. An ink which contains a recording agent and a liquid medium for dissolving or dispersing said recording agent, said ink being characterized in that said ink contains 0.01 to 50 ppm of a chelating agent based on the total weight of said ink.

2. The ink according to claim 1, which contains 0.01 to 10 ppm of said chelating agent based on the total weight of said ink.

3. The ink according to claim 1, which contains 0.01 to 4 ppm of said chelating agent based on the total weight of said ink.

4. The ink according to claim 1, wherein said chelating agent is ethylenediaminetetraacetic acid (EDTA).

5. The ink according to claim 1, wherein said ink is for ink jet recording.

6. The ink according to claim 1, wherein said ink is an ink for use in a method to eject ink droplets by applying thermal energy to said ink.

7. The ink according to claim 1, wherein the viscosity of said ink is in the range of 0.7 to 12 cP at 25° C.

8. The ink according to claim 1, wherein the viscosity of said ink is in the range of 1 to 5 cP at 25° C.

9. The ink according to claim 1, wherein the surface tension of said ink is in the range of 26 to 60 dyne/cm at 25° C.

10. The ink according to claim 1, wherein the content of water in said ink is in the range of 40 to 96% by weight based on the total weight of said ink.

11. The ink according to claim 1, wherein the content of water in said ink is in the range of 60 to 95% by weight based on the total weight of said ink.

12. The ink according to claim 1, wherein the content of water in said ink is in the range of 73 to 94% by weight based on the total weight of said ink.

13. A method for ink jet recording in which said recording is carried out by ejecting an ink in the form of droplets, said method being characterized in that said ink contains a recording agent, a liquid medium for dissolving or dispersing said recording agent, and 0.01 to 50 ppm of a chelating agent based on the total weight of said ink.

14. The method for ink jet recording according to claim 13, wherein said chelating agent is ethylenediaminetetraacetic acid (EDTA).

15. The method for ink jet recording according to claim 13, wherein said recording method is a method to eject ink droplets by applying thermal energy to said ink.

16. An ink jet recording unit which comprises an ink receiving portion for receiving an ink and a head portion for ejecting said ink in the form of droplets, said unit being characterized in that said ink is an ink according to any one of claims 1 to 12.

17. The recording unit according to claim 16, wherein said head portion comprises a head to eject ink droplets by applying thermal energy to said ink.

18. An ink cartridge equipped with an ink receiving portion for receiving an ink, said cartridge being characterized in that said ink is an ink according to any one of claims 1 to 12.

19. An ink jet recording apparatus which comprises an ink receiving portion for receiving an ink and a head portion for ejecting said ink in the form of droplets, said apparatus being characterized in that said ink is an ink according to any one of claims 1 to 12.

20. The ink jet recording apparatus according to claim 19, wherein said head portion contains a head to eject ink droplets by applying thermal energy to said ink.

21. An ink jet recording apparatus which comprises an ink cartridge equipped with an ink receiving portion for receiving said ink and a head portion for ejecting said ink in the form of droplets, said apparatus being characterized in that said ink is an ink according to any one of claims 1 to 12.

22. The ink jet recording apparatus according to claim 21, which has an ink feed portion for feeding said ink received in said ink cartridge to said recording head.

23. The ink jet recording apparatus according to claim 21, wherein said head portion contains a head to eject ink droplets by applying thermal energy to said ink

* * * * *

UNITED STATES PATENT AND TRADEMARK OFFICE
CERTIFICATE OF CORRECTION

PATENT NO. : 5,380,358  
DATED : January 10, 1995  
INVENTOR(S) : MAKOTO AOKI ET AL.

Page 1 of 3

It is certified that error appears in the above-indentified patent and that said Letters Patent is hereby corrected as shown below:

COLUMN 1

Line 45, "following" should read --the following--.

COLUMN 2

Line 8, "abovemen-" should read --above-men- --;  
Line 15, "evapotable" should read --evaporable--;  
Line 18, "evapotable" should read --evaporable--;  
Line 47, "generait" should read --general,--; and  
Line 54, "the" (second occurrence) should be deleted.

COLUMN 3

Line 3, "The" should read --the--.  
Line 4, "hearty" should read --heavy--.  
Line 27, "printing" should read --the printing--.  
Line 31, "ior" should read --for--.  
Line 47, "the" should be deleted.

COLUMN 4

Line 68, "timers" should read --times--.

UNITED STATES PATENT AND TRADEMARK OFFICE
CERTIFICATE OF CORRECTION

PATENT NO. : 5,380,358

DATED : January 10, 1995

INVENTOR(S) : MAKOTO AOKI ET AL.

It is certified that error appears in the above-indentified patent and that said Letters Patent is hereby corrected as shown below:

COLUMN 5

Line 55, "The" should read --the--; and
    Line 60, "thyl)ethylenediaminetriacetic" should read --thyl)-ethylenediaminetriacetic--.

COLUMN 7

Line 8, "an" should be deleted;
    Line 21, "the" should be deleted;
    Line 27, "arid" should read --and--;
    Line 42, "to by" should read --to 0.5% by--;
    Line 43, "raDly" should read --rably--; and
    Line 62, "projected," should read --projected--.

COLUMN 8

Line 44, "cross sectional" should read --cross-sectional--.

COLUMN 10

Line 10, "more" should read --in more--; and
    Line 61, "featbering" should read --feathering--.

COLUMN 11

Line 6, "minuts." should read --minutes.--;
    Line 12, "again," should read --again.--;
    Line 15, "operation," should read --operation.--; and
    Line 40, "cf" should read --of--.

UNITED STATES PATENT AND TRADEMARK OFFICE
CERTIFICATE OF CORRECTION

PATENT NO. : 5,380,358

DATED : January 10, 1995

INVENTOR(S) : MAKOTO AOKI ET AL.

It is certified that error appears in the above-indentified patent and that said Letters Patent is hereby corrected as shown below:

COLUMN 14

Line 57, "ink" should read --ink.--

Signed and Sealed this

Twenty-sixth Day of September, 1995

Attest:

BRUCE LEHMAN

Attesting Officer     Commissioner of Patents and Trademarks